United States Patent [19]

Khemani et al.

[11] Patent Number: 5,696,176
[45] Date of Patent: Dec. 9, 1997

[54] FOAMABLE POLYESTER COMPOSITIONS HAVING A LOW LEVEL OF UNREACTED BRANCHING AGENT

[75] Inventors: Kishan Chand Khemani, Johnson City; Carlos Humberto Juarez-Garcia, Blountville; Gary Darrel Boone, Johnson City, all of Tenn.

[73] Assignee: Eastman Chemical Company, Kingsport, Tenn.

[21] Appl. No.: 532,208

[22] Filed: Sep. 22, 1995

[51] Int. Cl.⁶ .................................. C08J 9/08; C08J 9/10
[52] U.S. Cl. .......................... 521/81; 264/50; 264/54; 521/79; 521/138
[58] Field of Search .................. 264/50, 54; 521/79, 521/81, 138

[56] References Cited

U.S. PATENT DOCUMENTS

| | | | |
|---|---|---|---|
| 3,553,157 | 1/1971 | Dijkstra et al. | 260/40 |
| 4,132,707 | 1/1979 | Borman | 528/273 |
| 4,145,466 | 3/1979 | Leslie et al. | 428/35 |
| 4,981,631 | 1/1991 | Cheung et al. | 264/50 |
| 4,999,388 | 3/1991 | Okamoto | 523/400 |
| 5,000,991 | 3/1991 | Hayashi et al. | 428/36.5 |
| 5,110,844 | 5/1992 | Hayashi et al. | 521/182 |
| 5,128,383 | 7/1992 | Amano et al. | 521/182 |
| 5,134,028 | 7/1992 | Rotter et al. | 521/81 |
| 5,288,764 | 2/1994 | Rotter et al. | 521/81 |
| 5,482,977 | 1/1996 | McConnell et al. | 521/81 |
| 5,519,066 | 5/1996 | McConnell et al. | 521/81 |

*Primary Examiner*—Morton Foelak
*Attorney, Agent, or Firm*—Cheryl J. Tubach; Harry J. Gwinnell

[57] ABSTRACT

This invention relates to a process for preparing foamable branched polyester compositions having increased melt viscosity and melt strength, and a reduced level of unreacted monomeric branching agent. The process involves melt blending (A) a composition containing a polyolefin and branching agent, (B) a nucleating agent either in powder form or (B') in the form of a composition containing a polyolefin and nucleating agent, and a polyester.

25 Claims, No Drawings

FOAMABLE POLYESTER COMPOSITIONS HAVING A LOW LEVEL OF UNREACTED BRANCHING AGENT

FIELD OF THE INVENTION

This invention relates to a process for preparing foamable branched polyester compositions having increased melt viscosity and melt strength, and a reduced level of unreacted branching agent.

BACKGROUND OF THE INVENTION

Many polymeric materials are foamed to provide low density articles such as films, cups, food trays, decorative ribbons, and furniture parts. For example, polystyrene beads containing low boiling hydrocarbons such as pentane are formers, into lightweight foamed cups for hot drinks such as coffee, tea, hot chocolate, and the like. Polypropylene can be extruded in the presence of blowing agents such as nitrogen or carbon dioxide gas to provide decorative films and ribbons for package wrappings. Also, polypropylene can be injection molded in the presence of blowing agents to form lightweight furniture such as lightweight chairs and table legs.

Polyesters such as poly(ethylene terephthalate) typically have a much higher density (e.g. about 1.3 g/cc) than other polymers. Therefore, it would be desirable to be able to foam polyester materials to decrease their weight for use in making molded parts, films, sheets, food trays, and the like. Such foamed articles also have better insulating properties than unfoamed parts. However, it is difficult to foam such polyester materials because of the low melt viscosity and low melt strength of typical poly(ethylene terephthalate) and related polyester polymers. The low melt viscosity and low melt strength of the polyesters adequately retain the bubbles of an expanding gas during molding or extrusion operations. It would be desirable therefore to be able to provide polyester polymers which could be foamed with conventional foaming systems.

One approach to providing polyesters with acceptable melt viscosities involves treating preformed polyesters with monomeric branching agents such as multifunctional carboxylic acids, anhydrides or polyols to provide branched polyesters. Such compositions are disclosed in U.S. Pat. Nos. 3,553,157, 4,132,707, 4,145,466, 4,999,388, 5,000,991, 5,110,844, 5,128,383, 5,134,028, and 5,288,764. The branching agents used include tri- and tetracarboxylic acids and anhydrides such as trimesic acid, pyromellitic acid, and pyromellitic dianhydride (PMDA) or polyols such as trimethylolpropane and pentaerythritol.

U.S. Pat. No. 5,288,764 discloses a process for preparing a foamed polyester resin which involves forming a molten mixture containing two separate polyester resins with at least one of the polyester resins containing a branching agent, adding a blowing agent to the molten mixture, and extruding the resultant mixture to obtain a foam. To promote the reaction between the branching agent and the polyester, U.S. Pat. No. 5,288,764 teach the addition of an organic or inorganic Group I, II or III metal compound. Moreover, U.S. Pat. No. 5,288,764 teaches that poor quality foam is obtained when a polyolefin is substituted for the polyester as the carrier resin of the branching agent.

U.S. Pat. No. 5,000,991 discloses a process for preparing a polyester foam which involves melting a polyester resin and a branching agent, mixing the molten resin with a blowing agent and extruding the mixture. To promote the reaction between the branching agent and the polyester, U.S. Pat. No. 5,000,991 teaches the addition of an organic or inorganic compounds from Group I, II or III metals of the Periodic Table. Moreover, U.S. Pat. No. 5,000,991 teaches away from using polyolefins as a carrier of the branching agent. The disadvantage associated with the aforementioned patents to produce polyester foam is that the level of free or unreacted monomeric branching agent, for example pyromellitic dianhydride (PMDA), is unacceptably high for most food packaging applications.

SUMMARY OF THE INVENTION

The process of the present invention is used to prepare a foamable branched polyester composition having a reduced level of unreacted monomeric branching agent. The foamable branched polyester composition displays increased melt viscosity and melt strength during extrusion, and is prepared by a process comprising melt blending:

(A) a composition consisting essentially of:
   (1) 50 to 99 weight % of a polyolefin having a repeat unit selected from the group consisting of ethylene, propylene, butene, and combinations thereof, provided the ethylene polymers have a melt index of 0 to 100 at 190° C. as measured by ASTM D1238-56T, and the propylene and butene polymers have a melt flow rate of 0 to 100 at 230° C. as measured by ASTM D1238-56T; and
   (2) 1 to 50 weight % of a monomeric branching agent having a molecular weight of 50 to 5000 selected from the group consisting of a carboxylic acid having at least two carboxyl groups, and an anhydride having at least one anhydride group, and combinations thereof, provided a reactive compound of a Group I, II, or III metal is not included in composition (A);
(B) at least one nucleating agent in powder form;. and
(C) a polyester having an inherent viscosity of 0.4 to 1.1 dL/g comprising repeat units from
   (a) a dicarboxylic acid selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms, and combinations thereof; and
   (b) a diol selected from the group consisting of cycloaliphatic diols having 6 to 20 carbon atoms, aliphatic diols having 3 to 20 carbon atoms, and combinations thereof,
wherein the foamable branched polyester composition comprises 0.1 to 2.0 weight %.of (A), 0.01 to 10 weight % of (B), 80 to 99.9 weight % of (C), based on the total weight of (A), (B), and (C).

In the alternative, the nucleating agent may be added in the form of a composition (B') consisting essentially
   (3) 50 to 99 weight % of a polyolefin having a repeat unit selected from the group consisting of ethylene, propylene, butane, and combinations thereof, provided the ethylene polymers have a melt index of 0 to 100 at 190° C., and the propylons and butane polymers have a melt flow rate of 0 to 100 at and
   (4) 1 to 50 weight %, of at least one nucleating agent, provided a reactive compound of a Group I, II, or III metal is not included in composition (B'),
wherein the foamable branched polyester composition comprises 0.1 to 20 weight % of (A), 0.02 to 20 weight % of (B'), 80 to 99.9 weight % of (C), based on the total weight of (A), (B'), and (C).

DESCRIPTION OF THE INVENTION

The process of the present invention is used to prepare a foamable branched polyester composition having increased melt viscosity and melt strength, and a reduced level of unreacted monomeric branching agent, preferably less than 50 parts per million (ppm), more preferably less than 5 ppm, of unreacted monomeric branching agent. Component (A) is a composition containing a polyolefin and a monomeric branching agent.

The polyolefin is added in an amount of 50 to 99 weight percent, preferably 70 to 95 weight percent, based on the weight of the polyolefin and monomeric branching agent. The polyolefin is selected from linear low density polyethylene, conventional low density polyethylene, high density polyethylene, ethylene copolymers with α-olefins containing 2 to 10 carbon atoms, polypropylene, propylene copolymers with α-olefins containing 2 to 10 carbon atoms, poly-1-butene, butene copolymers with α-olefins containing 2 to 10 carbon atoms, poly-4-methyl-1-pentene, 4-methyl-1-pentene copolymers with α-olefins containing 2 to 10 carbon atoms and the like. The ethylene polymers have melt index values as measured by ASTM Method No. D1238-56T of 0 to 100 at 190° .C, preferably 0.1 to 20. Propylene and butene polymers have melt flow rate values as measured by ASTM Method No. D1238-56T of 0 to 100 at 230° C., preferably 0.1 to 20 at 230° C. The olefin polymers are readily prepared by conventional methods.

The polyolefin is melt blended with a monomeric branching agent in an amount of 1 to 50 weight percent, preferably 5 to 30 weight percent, based on the amount of polyolefin. The monomeric branching agent has a molecular weight of 50 to 5000, preferably, 100 to 1000. The monomeric branching agent is selected from a carboxylic acid having at least two carboxyl groups, and an anhydride having at least one anhydride group. Suitable carboxylic acid monomeric branching agents also include polycarboxylic acids. Preferably, the carboxylic acid monomeric branching agents are used in the form of their lower alkyl esters or as their cyclic anhydrides.

Suitable monomeric branching agents, for example, are trimesic acid, pyromellitic acid, pyromellitic dianhydride, trimellitic anhydride, benzenetetra carboxylic anhydride, benzophenone tetracarboxylic anhydride, hemimeltitic acid, trimellitic acid, pyromellitic acid, pyromellitic acid, 1,1,2,2-ethanetetracarboxylic acid, 1,1,2-ethanetricarboxylic acid, 1,3,5-pentanetricarboxylic acid, and 1,2,3,4-cyclopentanetetracarboxylic acid. Preferably, the monomeric branching agent is selected from pyromellitic dianhydride (PMDA), trimellitic anhydride, benzenetetra carboxylic dianhydride and benzophenone tetracarboxylic dianhydride. Combinations of monomeric branching agents may also be used.

Composition (A) is prepared by melt blending the polyolefin and the monomeric branching agent in an extruder, Branbury mixer or other conventional melt mixing device until a homogeneous blend is obtained which is extruded and pelletized.

The nucleating agent is added to the foamable polyester composition either as a powder (B) and/or in the form of a composition (B'). In the case the nucleating agent is added in powder form, the nucleating agent is present in the foamable branched polyester composition in an amount of 0.01 to 10 weight %, preferably 0.1 to 2 weight %, based on the total weight of (A), (B), and (C).

The nucleating agent may alternatively be added in the form of a composition (B') which contains a polyolefin and a nucleating agent. In the case the nucleating agent is added in the form of a composition, the nucleating agent composition is present in the foamable branched polyester composition in an amount of 0.02 to 20 weight %, preferably 1 to 10 weight %, more preferably 2 to 5 weight %, based on the total weight of (A), (B'), and (C).

The nucleating agent composition (B') contains a polyolefin and a nucleating agent. The polyolefin is added in an amount of 50 to 99 weight percent, preferably 60 to 80 weight percent, based on the weight of the polyolefin and nucleating agent. The polyolefin is melt blended with 1 to 50 weight percent, preferably 10 to 20 weight percent, of the nucleating agent.

The polyolefin is selected from linear low density polyethylene, conventional low density polyethylene, high density polyethylene, ethylene copolymers with α-olefins containing 2 to 10 carbon atoms, polypropylene, propylene copolymers with α-olefins containing 2 to 10 carbon atoms, poly-1-butene, 1-butene copolymers with α-olefins containing 2 to 10 carbon atoms, poly-4-methyl-1-pentene, 4-methyl-1-pentene copolymers with α-olefins containing 2 to 10 carbon atoms and the like. The ethylene polymers have melt index values as measured by ASTM Method No. D1238-56T of 0 to 100 at 190° C., preferably 0.1 to 20. Propylene and butene polymers have melt flow rate values as measured by ASTM Method No. D1238-56T of 0 to 100 at 230° C., preferably 0.1 to 20 at 230° C. The olefin polymers are readily prepared by conventional methods.

Any nucleating agent may be used as long as the nucleating agent is capable of providing a nucleation site. Suitable nucleating agents include, for example, titanium dioxide, talc, chopped fiber glass, alumina, clay, and fumed silica. A combination of nucleating agents may also be added. Optionally, other additives known to those skilled in the art to be used with polyolefins and polyesters may be included in the composition of (B'). Such additives include, for example, stabilizers; antioxidants, such as IRGONOX 1010 and ETHANOX 330; buffers; flame retardants; lubricants; extenders; colorants; and pigments such as carbon black and dyes.

It is important to note, however, that a reactive compound of a Group I, II, or III metal, such as sodium carbonate, must not be included in compositions (A) or (B'). The present inventors have determined that the use of reactive compounds of Group I, II or III metals has an adverse effect on the amount of unreacted or free monomeric branching agent in the final polyester product. While not wishing to be bound by any particular mechanism or theory, the present inventors believe that the presence of any organic or inorganic compounds of Group I, II or III metals result in conversion of the monomeric branching agent to its metallic salt form which is unable to react with the polyester.

The polyester (C) is melt blended with composition (A) and either the nucleating agent (B) and/or composition (B'). A wide range of polyesters may be used. The polyester is present in an amount of 80 to 99.9 weight percent, preferably 95 to 99 weight percent, based on the weight of the compositions (A) and (B'). The polyester has an inherent viscosity of 0.4 to 1.1 dL/g as measured at 23° C. using 0.50 grams of polymer per 100 ml of a solvent consisting of 60% by weight phenol and 40% by weight tetrachloroethane.

When the polyester is melt blended with composition (A) and the nucleating agent at elevated temperatures, the monomeric branching agent reacts with the polyester to provide branching and thus to increase the melt viscosity and the melt strength of the polyester. A compound of a Group I, II, or III metal in an amount of 0.001 to 1 weight % may be melt blended with the polyester, if desired, to modify the physical characteristics of the foam product.

The polyester contains repeat units from 100 mole percent dicarboxylic acid and 100 mole percent diol. Dicarboxylic acids useful in the present invention include aromatic dicarboxylic acids preferably having 8 to 14 carbon atoms, saturated aliphatic dicarboxylic acids preferably having 4 to 12 carbon atoms, and cycloaliphatic dicarboxylic acids preferably having 8 to 12 carbon atoms. Specific examples of dicarboxylic acids are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, and sebacic acid. Preferably, the dicarboxylic acid is selected from terephthalic acid, isophthalic acid, naphthalenedicarboxylic acid, and cyclohexanedicarboxylic acid. The polyester may be prepared from one or more of the above dicarboxylic acids.

It should be understood that use of the corresponding acid anhydrides, esters, and acid chlorides of these acids is included in the term "dicarboxylic acid".

Diols useful in the present invention include cycloaliphatic diols preferably having 6 to 20 carbon atoms or aliphatic diols preferably having 3 to 20 carbon atoms. Specific examples of diols are: 1,4-cyclohexanedimethanol, ethylene glycol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Preferably the diol is selected from ethylene glycol, 1,4-butanediol, and 1,4-cyclohexane-dimethanol. The polyester may be prepared from one or more of the above diols. The polyester is prepared by conventional melt phase or solid state polycondensation techniques well known in the art.

Optionally, the polyester may include an antioxidant in an amount up to two percent by weight of the polyester. Preferably, the amount of antioxidant is 0.1 to 1 percent by weight of the polyester. The antioxidant may be added with the monomers prior to the formation of the polyester or, if desired, added to the molten polymer after polymerization has been completed. The antioxidant may also be melt blended with the polyester. Preferably, the antioxidant is added with the monomers before polymerization of the polyester is initiated.

The polyester may also contain an additive. Additives such as nucleating agents, for example, titanium dioxide, talc, chopped fiber glass, alumina, clay, and fumed silica, stabilizers, antioxidants, such as IRGONOX 1010 and ETHANOX 330, buffers, flame retardants, lubricants, extenders, colorants, and pigments such as carbon black and dyes, normally used with polymers may be used if desired. Such additives, their amounts, and their use are well known in the art. For example, improvement in light stability is possible by the addition of small amounts of pigments or the incorporation of a light stabilizer, such as ultraviolet light absorbers.

The polyester compositions prepared by the process of the present invention are dried in a conventional or vacuum oven and are extruded or molded by conventional techniques. The polyester compositions are useful in a variety of end uses including the manufacture of films, tubes, foams, blow molded objects, extrusion coated materials, food packaging containers, injection molded parts and the like. While the polyester compositions can be used in many molding or extrusion applications, for example, injection molding, injection blow molding, extrusion, extrusion blow molding, etc., to form non-foamed products, the polyester compositions are preferably used to prepare foamed articles particularly for use in the food packaging industry. The foam articles prepared from the polyester compositions are in compliance with European Union (EU) regulations for global (total) migration, antimony migration, and PMDA migration into food simulating solvents. In addition, the foam articles are within the Food and Drug Administration (FDA) guidelines (1988 Recommendations for Chemistry Data for Indirect Additive Petitions) for evaluation of PMDA migration into food simulating solvents.

Foaming polymers is a process well known in the art. Extrusion techniques common to those skilled in the art can be used to foam the polyester and composition of the present invention, preferably to densities less than 1.1 g/cc, more preferably, densities of less than about 0.2 g/cc are achieved.

In a typical foam extrusion process, the basic apparatus comprises a single extruder (preferably a length to diameter ratio of at least about 30:1), a liquid injection pump or gas cylinder with injector valves, a die to form the desired object, a cooling devise and a devise to collect the expanded, extruded product.

In such a process a two-stage screw is typically used but is not critically necessary. The polyester and composition are preferably added to the extruder feed hopper (or hoppers) and fed to the feed section of the screw. The polyester and composition are melted in the transition section of the screw and the blowing agent added either in the transition section of the screw or near the beginning of the metering section.

Suitable blowing agents include inert gases, such as nitrogen and carbon dioxide, hydrocarbons boiling about $-40°$ C. to about $45°$ C., such as propane, butane and pentane; hydrofluorcarbons such as 1,1-difluoroethane and 1,1,1,2-tetrafluoroethane; and hydrochlorofluorocarbons; and gas liberating chemical blowing agents, such as sodium bicarbonate, a combination of citric acid and sodium bicarbonate, a combination of citric acid and sodium carbonate, azodicarbonamide and various endothermic blowing agents which release $CO_2$ and/or $N_2$. Mixtures of blowing agents can also be used. Blowing agents are used in amounts of about 0.01 to about 20% (by weight based upon the weight of the polyester and blowing agent) to obtain the desired high expansion ratios. Concentrations of about 0.1 to about 5 wt percent are typical.

The resin melt containing dissolved and/or dispersed blowing agent is metered by the screw to the die. Upon exiting the die, the melt is expanded, optionally shaped, cooled and collected. The temperature profile on the extruder and die is adjusted to melt the polyester in the extruder prior to the injection of the blowing agent and adequately cool the melt/blowing agent composition to allow for expansion without coalescence.

Another typical foam extrusion process employs two extruders operating in tandem. In this process the polyester is mixed, melted and the blowing agent injected in the first extruder. The melt/blowing agent composition is transferred by means of a conventional transfer tube to the feed section of the second extruder which is used to transfer the melt blend to the die and to bring the melt temperature and pressure in the die to the values necessary for optimum foam formation. Typically the two extruders are of different sizes. The tandem extruder process allows for excellent control of process variables.

Various screw configurations and designs can be used to prepare foamed polyesters. Mixers can be added to the screw or as independent components to disperse additives, nucleation agents, and blowing agents. Twin screw extruders or satellite extruders may also be used. Satellite extruders may be used for co-extrusion of a thin, solid, nonfoamed, polymer layer on the foamed polyester sheet. Additionally, thin nonfoamed layers of polymers may also be applied on the foamed sheet through a separate lamination process.

The materials and Testing Procedures used for the results shown herein are as follows:

I. Analysis of Total PMDA in Polyolefin Composition

This method to measure the total amount of PMDA compounded in polyolefin composition batch is based on a hydrolysis procedure. The samples were dissolved in hot p-xylene and appropriate amounts of trifluoroacetic acid and water were added to hydrolyze PMDA to its acid form, pyromellitic acid (PMA). The PMA produced was measured by a reversed phase liquid chromatography procedure using an UV (absorption at 255 nm) detection method. The quantitation was performed by calibrating the detector using standards of PMA that have been prepared similarly as the samples of polyolefin compositions. Details of the procedure are as follows:

Liquid Chromatograph: WATERS 510

Detector: WATERS Lambda Max 451 UV-Visible, operating at 255 nm.

Autosampler: Perkin Elmer LC-600.

Data Processing Software: ACCESS*CHROM Chromatography Data System.

Calculation type: Multilevel (3) with benzoic acid as internal standard.

Column: BDS-Hypersil C-18, 250×4.6 mm with 120 micron particle size.

Injection: 5 microliters

Elution: Linear gradient (see below for description of mobile phases)

| Time | Flow (ml/min) | % A | % B |
|------|---------------|-----|-----|
| Initial | 1.5 | 100 | 0 |
| 12 | 1.5 | 40 | 60 |
| 13 | 1.5 | 0 | 100 |
| 19 | 1.5 | 0 | 100 |
| 20 | 1.5 | 100 | 0 |
| 25 | 1.5 | 100 | 60 |

Reagents:
a) p-Xylene.
b) Reagent Grade Water (e.g. water produced by a Millipore Milli-Q™ purification system).
c) Reagent grade trifluoroacetic acid.
d) Diluting solution. This is a solution of 50/50 (v/v) of THF/Acetonitrile containing benzoic acid as an internal standard with a concentration of 0.1 g/L.
e) Acetonitrile used as mobile phase. Designated as mobile phase B.
f) 0.1% phosphoric acid in water used as mobile phase. Designated as mobile phase A.
g) PMA (pyromellitic acid).

Sample Preparation:
a) Weight about 0.15 g of polyolefin composition to four decimal places.
b) Transfer to a culture tube (The tube needs to be the kind that has a teflon lined screw cap).
c) Add 10 ml of p-xylene.
d) Add 1 ml of trifluoroacetic acid. Measured with a graduate cylinder
e) Add 0.2 ml of water measured with an appropriate syringe or pipette.
f) Add a 1 inch magnetic stirring bar.
g) Cap the tube and heat to 120° C. for one hour while stirring.
h) After the heating period, cool the tubes to room temperature. Open the tubes and add 10 ml of the diluting solution.
i) Transfer the mixture to a 250-ml volumetric flask.
j) Wash the tube two more times with 10 ml of the diluting solution and transfer the washing to the volumetric flask. Fill to the mark with the same diluting solution.
k) Transfer an aliquot from the 250-ml volumetric flask to a syringe equipped with a 0.45 micron PTFE filter. Filter the sample and collect the filtrate in a LC vial.
l) The sample is ready for analysis.

Calibration Standard Preparation:
a) Three different standards are prepared. Weigh the appropriate amount of PMA (described below) to four decimal places and transfer to a 250-ml volumetric flask.
b) Add 10 ml of p-xylene and 1 ml of TFA.
c) Add 100 ml of the diluting solution and dissolve the sample.
d) Fill the flask to the mark with the diluting solution.
e) Transfer an aliquot from the 250-ml volumetric flask to a LC vial.
f) Standard 1:0.0400 g, Standard 2:0.0200 g, Standard 3:0.0100 g.

Precision and Accuracy:

The precision was determined from five replicate analyses of two different samples shown below. The accuracy has not been rigorously evaluated due to the lack of a standard of known concentration, but recovery studies performed yielded results in the 98–100%.

| Sample | Mean | Standard | RSD (%) |
|--------|------|----------|---------|
| 80%PP - 20% PMDA | 20.1034 | 0.1934 | 0.9622 |
| 90%PP - 10% PMDA | 9.9732 | 0.3071 | 3.0794 |

II. Analysis of "Active" PMDA in Polyolefin Composition

This method to measure active PMDA (i.e. the amount of PMDA which was not hydrolyzed to acid-anhydride or the PMA during the compounding) in the polyolefin composition was based on making a derivative with diethylamine. The samples were dissolved in hot p-xylene and an appropriate amount of diethylamine was added. The samples were heated to 120° C. for 1 hour to allow for the derivatization reaction to occur. The diethylamine derivatives of PMDA were measured by a reversed phase liquid chromatography procedure using a UV (absorption at 255 nm) detection method. The detector was calibrated using standards prepared from pure PMDA and treated in an identical fashion as the polyolefin composition. Details of the procedure were as follows:

Liquid Chromatograph: WATERS 510

Detector: WATERS Lambda Max 451 UV-Visible. Operating at 255 mm.

Autosampler: PERKIN ELMER LC-600.

Data Processing Software: ACCESS,CHROM Chromatography Data System.

Calculation type: Single point calculation.

Column: BDS-Hypersil C-18, 250×4.6 mm with 120 micron particle size.

Injection: 5 microliters

Elution: Linear gradient (see a description of the mobile phases below)

| Time    | Flow (ml/min) | % A | % B |
|---------|---------------|-----|-----|
| Initial | 1.5           | 100 | 0   |
| 12      | 1.5           | 40  | 60  |
| 13      | 1.5           | 0   | 100 |
| 19      | 1.5           | 0   | 100 |
| 20      | 1.5           | 100 | 0   |
| 25      | 1.5           | 100 | 0   |

Reagents
 a) p-Xylene.
 b) Anhydrous Diethylamine: Reagent can be obtained from Aldrich Chemicals.
 c) (Cat. No. 38645-6).
 d) Reagent grade trifluoroacetic acid.
 e) Diluting solution: This is a solution of 50/50 (v/v) of THF/Acetonitrile.
 f) Acetonitrile used as mobile phase. Designated as mobile phase B.
 g) 0.1% phosphoric acid in water used as mobile phase. Designated as mobile phase A.
 h) Pyromellitic dianhydride: Reagent can be obtained from Aldrich (Cat.No. B402-3).

Sample Preparation:
 a) Weigh 0.15 grams of sample (to the fourth decimal place) into a 25 mm×150 mm culture tube.
 b) Add 10 ml of p-xylene.
 c) Add 2 ml of diethyl amine.
 d) Cap and heat for at 120° C. for 1 hour.
 e) Let the test tubes cool to room temperature.
 f) Add 10 ml of the diluting solution and shake.
 g) Add 3.5 ml of trifluoroacetic acid.
 h) Transfer to a 250 ml volumetric flask.
 i) Continue to wash out the culture tube with the diluting solution into the volumetric flask.
 j) Fill the 250-ml flask to the mark with the diluting solution.
 k) Filter approximately 1.5 ml of sample through a 0.45 micron filter onto a LC auto sampler vial.

Calibration Standard Preparation.
 a) Weigh 0.02 grams of pure pyromellitic dianhydride to the fourth decimal place.
 b) Add 10 ml of p-xylene.
 c) Add 2 ml of diethyl amine.
 d) Cap and heat for at 120° C. for 1 hour.
 e) Let the test tubes cool to room temperature.
 f) Add 10 ml of the diluting solution and shake.
 g) Add 3.5 ml of trifluoroacetic acid.
 h) Transfer to a 250 ml volumetric flask.
 i) Continue to wash out the culture tube with the diluting solution into the volumetric flask.
 j) Fill the 250-ml flask to the mark with the diluting solution.
 k) Filter approximately 1.5 ml of sample through a 0.45 micron filter onto a LC auto sampler vial.

Precision and Accuracy:

The precision was determined from eight replicate analyses of one sample. The accuracy has not been rigorously evaluated due to the lack of a standard of known concentration, but recovery studies performed yielded results in the 95-100%.

III. Analysis of Total PMDA in the Polyester Blend

This analysis of total PMDA in the polyester blend was based on an hydrolysis procedure. The polyester sample was hydrolyzed in a solution of potassium hydroxide in a mixture of methanol and dimethyl sulfoxide. The polyester was hydrolyzed back to the monomeric components. Any unreacted and reacted PMDA is therefore in solution and in the form of the tetracarboxilic acid, PMA. The PMA is analyzed by a anion exchange liquid chromatography procedure using an UV (absorption at 210 nm) detection method. The detector was calibrated with standards prepared from pure PMA. Details of the procedure were as follows: Liquid Chromatograph: HEWLETT PACKARD 1090

Detector: APPLIED BIOSYSTEMS 783A operating at 210 nm

Autosampler: HEWLETT PACKARD 1090.

Data Processing Software: ACCESS*CHROM Chromatography Data System.

Calculation type: Multilevel (3)

Column: WHATMAN PARTSIL-SAX, 100 mm×4.6 mm.

Injection: 20 microliters

Elution: Isocratic run at 1.0 ml minute

Reagents:
 a) $KH_2PO_4$: Reagent can be obtained from Mallinckrodt.
 b) Phosphoric acid.
 c) $NaH_2PO_4$: Reagent can be obtained from Mallinckrodt.
 d) $Na_2HPO_4$: Reagent can be obtained from Mallinckrodt.
 e) Trifluoroacetic acid.
 f) Reagent Grade Water (e.g. water produced by a Millipore Milli-Q™ purification system)
 g) Mobile Phase:
  1) Weigh 20.4135 g of KH2PO4 into a plastic weighing boat and transfer to 1 liter volumetric flask.
  2) Add 500 ml of water and dissolve the $KH_2PO_4$.
  3) Add 150 ml of Acetonitrile to the volumetric flask and fill to the mark with water.
  4) Transfer to a 1 Liter Wheaton Bottle and adjust the pH to 2.6 by adding compositiond phosphoric acid dropwise.
 a) Pyromellitic acid (PMA): Reagent can be obtained from Aldrich.

Sample Preparation:
 a) Weigh 0.15 g of sample to the fourth decimal place.
 b) Transfer to a culture test tube and add 10 ml of 0.5N KOH in methanol: DMSO (50/50)
 c) Heat the samples to 120° C. for 30 minutes.
 d) Transfer hydrolyzed sample to a 100 ml volumetric flask with the 90:10 solution of 0.2M $KH_2PO_4$ in acetonitrile.
 e) Mix and place in a ultrasonic bath for 5 minutes.
 f) Filter 1.5 ml of the solution from the 100-ml flask through a 0.45 micron filter and receive the filtrate in a LC vial.

Calibration Standard Preparation:
 a) Prepare a stock solution of PMA by weighing 0.0500 grams to the fourth decimal place.

b) Transfer the PMA to a 50 ml volumetric flask.

c) Add 2 ml of 2.5 N KOH in methanol.

d) Add 20 ml of water and place in a sonicating bath for 10 minutes.

e) Fill the flask to the mark with water.

f) Make a 0.1 to 100 dilution of the stock solution to give an approximate concentration of 1E-3 g/L.

g) Make a 0.25 to 100 dilution of the stock solution to give an approximate concentration of 2.5E-3 g/L.

h) Make a 1.0 to 100 dilution of the stock solution to give an approximate concentration of 1E-2 g/L.

i) The diluting solution to prepare the standards (steps f to h) is a 90:10 solution of 0.2M $KH_2PO_4$ in acetonitrile.

Precision and Accuracy:

The precision was determined from 8 replicate analyses of one sample. The accuracy has not been rigorously evaluated due to the lack of a standard of known concentration, but recovery studies performed yielded results in the 95–100%.

IV. Analysis of "Unreacted" Or "Free" PMDA in the Polyester Blend

This analysis of the unreacted PMDA in the polyester blend was based on a dissolution of the sample followed by a hydrolysis procedure to convert PMDA to PMA. The samples were dissolved in trifluoroacetic acid and the polymer was subsequently precipitated by adding appropriate amounts of chloroform, acetone and water. The sample was filtered. The pH of the filtrate that contains the PMA is adjusted. The analysis of PMA is accomplished by a anion exchange liquid chromatography method. PMA was measured by an UV (absorption at 210 nm) detection method. The detector was calibrated using standards prepared from pure PMA. Details of the procedure were as follows:

Liquid Chromatograph: HEWLETT PACKARD 1090

Detector: APPLIED BIOSYSTEMS 783A operating at 210 nm

Autosampler: HEWLETT PACKARD 1090.

Data Processing Software: ACCESS.CHROM Chromatography Data System.

Calculation type: Multilevel (3)

Column: WHATMAN PARTSIL-SAX, 100 mm×4.6

Injection: 20 microliters

Elution: Isocratic run at 1.0 ml minute

Reagents:

a) $KH_2PO_4$: Reagent can be obtained from Mallinckrodt.

b) Phosphoric acid.

c) $NaH_2PO_4$: Reagent can be obtained from Mallinckrodt.

d) $Na_2HPO_4$: Reagent can be obtained from Mallinckrodt.

e) Trifluoroacetic acid.

f) Chloroform.

g) Reagent Grade Water (e.g. water produced by a Millipore Milli-Q™ purification system)

h) Acetone.

i) Ammonium Hydroxide.

j) Mobile Phase:
1) Weigh 20.4135 g of $KH_2PO_4$ into a plastic weighing boat and transfer to 1 liter volumetric flask.
2) Add 500 ml of water and dissolve the $KH_2PO_4$.
3) Add 150 ml of acetonitrile to the volumetric flask and fill to the mark with water.
4) Transfer to a 1 Liter Wheaton Bottle and adjust the pH to 2.6 by adding compositiond phosphoric acid dropwise.

k) Filtrate wash solution:
1) Weigh 1.8455 grams of $Na_2HPO_4$ into a plastic weighing pan. Transfer to a 1 liter volumetric flask.
2) Weigh 0.9659 grams of $NaH_2PO_4$ into a plastic weighing pan. Transfer to a 1 liter volumetric flask.
3) Add approximately 500 ml of reagent grade water and place in a sonic bath until dissolved.
4) Fill to the mark with reagent grade water.

l) Pyromellitic acid (PMA). Reagent can be obtained from Aldrich Chemicals (Cat. No. 41228-7).

Sample Preparation:

a) Weigh 2 grams (to the 4th decimal place) of sample into a 250 ml Erlenmeyer flask. Record the weight.

b) Add a 2 inch stir bar and place on a hot plate heated to 60° C.

c) Add 20 ml of trifluoroacetic acid to dissolve the polymer.

d) Stir for 1 hour (one hour is typically long enough for ground samples that pass through a 3 mm screen.)

e) After the sample has completely dissolved, remove from the heat and place in an ice and water bath for 15 minutes. During the addition of the additional chemicals, the sample needs to remain in the bath.

f) Add 35 ml of chloroform.

g) Using a separatory funnel, add 10 ml of acetone dropwise.

h) Using the same separatory funnel, add dropwise 35 ml of reagent grade water.

i) Add 25 ml of ammonium hydroxide (approximately 37%) dropwise.

j) Remove from the ice and water bath and heat at 60° C. for 1 hour. Let cool for 15 minutes.

k) Filter the samples under vacuum using a course fritted funnel.

l) Wash the flask, filter, and filtrate with reagent grade water.

m) Wash the flask, filter, and filtrate again using 50 ml of the filtrate wash solution.

n) After washing, use a Pasteur pipet to remove the chloroform layer from the bottom of the flask.

o) Adjust the pH of the sample to a value between 6.4 to 6.5 using concentrated phosphoric acid.

p) Transfer the sample to a 250 ml volumetric flask using reagent grade water to wash out the Erlenmeyer flask.

q) Fill to the mark with reagent grade water.

r) Filter approximately 1.5 ml of the sample through a 0.45 micron syringe filter into a LC auto sampler vial.

Calibration Standard Preparation:

a) Prepare a stock solution of PMA by weighing 0.0500 grams to the fourth decimal place.

b) Transfer the PMA to a 50-ml volumetric flask.

c) Add 2 ml of 2.5 N KOH in methanol.

d) Add 20 ml of water and place in a sonicating bath for 10 minutes.

e) Fill the flask to the mark with water.

f) Make a 0.1 to 100 dilution of the stock solution to give an approximate concentration of 1E-3 g/L.

g) Make a 0.25 to 100 dilution of the stock solution to give an approximate concentration of 2.5E-3 g/L.

h) Make a 1.0 to 100 dilution of the stock solution to give an approximate concentration of 1E-2 g/L.

i) The diluting solution to prepare the standards (steps h to i) is a 90:10 solution of 0.2M $KH_2PO_4$ in acetonitrile.

Precision and Accuracy:

The precision was determined from five replicate analyses of a sample.

| Sample | Mean | Std. Dev. | RSD % |
| --- | --- | --- | --- |
| Polyester Blend | 1391 ppm | 80 | 5.75 |

The accuracy of the method has not been rigorously evaluated due to the lack of a standard of known concentration, but recovery studies of spiked solutions of pyromellitic acid (PMA) with concentrations between $4 \times 10^{-3}$ g/L (800 ppm in a polymer sample, see sample preparation section) and $2 \times 10-3$ g/L (400 ppm in a polymer sample) yielded recoveries in the 92 to 100% range. The detection limit of the method was evaluated by preparing standards of PMA to concentrations as low as $2.5 \times 10^{-5}$ g/L (5 ppm in a polymer sample). It was determined that $2.5 \times 10^{-5}$ g/L was the lowest concentration that gives a signal for PMA that is detected but not easily quantitated.

V. Extractions and Analyses for Migration and Compliance Testing of Foam Samples Extractions:

a) Foam trays (three) were filled with 100 ml of 3% acetic acid/water and covered with a sheet of Teflon. A temperature probe was added to one tray. The trays were placed in a pressure cooker with a 15 psi pressure regulator until the temperature reached 100° C. The regulator was then removed and the temperature maintained for 2 hours at 100° C. After 2 hours, the samples were removed from the pressure cooker, cooled to room temperature, and poured into clean rinsed flasks.

b) Teflon pressure cells were used for the 8% ethanol/water extractions. The bottom part from four foam trays were cut into ½ dm² (7.75 in.²) sections. The ½ dm² sections were cut into 8 strips of about 1 in.², placed in pressure cells with wire spacers, and filled with 50 ml of solvent. The pressure cells were placed in a pressure cooker with a 15 psi pressure regulator. After the pressure reached 15 psi (250° F.), the samples were heated for 2 hours, removed from the oven, cooled to room temperature and poured into clean rinsed flasks.

c) Foam trays (four) filled with 100 g of HB 307 oil were placed in an oven at 175° C. It took about 2 hours for the oven temperature to recover to 175° C. The samples were then heated for 2 hours, removed from the oven, and the oil poured into flasks.

Area of Trays Exposed to Solvents:

The area of the trays exposed to 100 ml of solvents were determined by cutting a section of trays exposed to 100 ml, weighing and comparing to the weight of a 4 in.² section of the tray.

For strips cut from trays for the 8% Ethanol extractions in (b) above, both sides of the strips were used in calculating the area of exposure.

Total Migration Into Food Simulants

Total migration of polymer species into the food simulants was determined by UV/VIS analyses of the extracts.

PMDA and TPA in Food Stimulants

The migration of PMDA and TPA into the food stimulants was determined by HPLC using a UV detector. Note: During the extractions, pyromellitic dianhydride (PMDA) gets hydrolyzed to its acid form, pyromellitic acid (PMA), and is determined as such.

Antimony in Food Stimulants

Antimony migration into the food stimulant was determined by ICP/MS.

VI. Melt Strength

Melt Strength was determined according to ASTM D3835 measured at 280° C. by extruding the molten polyester downward through a die 0.1 inch in diameter and 0.25 inches long at a shear rate of 20 second$^{-1}$ using an Instron rheometer and allowing the extrudate to fall freely. The diameter of the end of a six inch length of extrudate, measured from the orifice of the die, is measured. The percent Melt Strength is determined from the formula:

$$\frac{D - 0.1}{0.1} \times 100$$

wherein D is the diameter, in inches, of the extrudate supporting a six inch length of extrudate. If D is less than 0.1 inch, the Melt Strength is a negative number since there is no increase in the diameter of the extrudate. If D is greater than 0.1 inch, the Melt Strength is a positive number.

VII. Melt Viscosity

Melt viscosity was measured according to ASTM D4440 at zero shear and 280° C.

VIII. Molecular Weight

Molecular weight was measured by gel permeation chromatography (GPC).

This invention will be further illustrated by a consideration of the following examples, which are intended to be exemplary of the invention. All parts and percentages in the examples are on a weight basis unless otherwise stated.

EXAMPLE 1

Preparation of 20 wt% PMDA composition based on polypropylene.

A PP/PMDA composition was prepared by melt blending in a 30 mm Werner and Pfleiderer twin screw extruder (400°–430° F.), 80 lb of polypropylene (melt flow rate 4) and 20 lb of pyromellitic dianhydride (PMDA). The extrudate in the shape of a rod (2–3 mm in diameter) was quenched by passing it in a cold water trough, and then chopped into pellets (2–3 mm long) and air dried.

This composition was tested according to Test Procedures I and II and shown to contain 20 wt % PMDA.

EXAMPLE 2

Preparation of 15 wt % PMDA composition based on polypropylene.

The procedure of Example 1 was repeated except that 85 lb of polypropylene and 15 lb of PMDA were used.

EXAMPLE 3

Preparation of 10 wt% PMDA composition based on polypropylene

The procedure of Example 1 was repeated except that 90 lb of polypropylene and 10 lb of PMDA were used.

EXAMPLE 4

Preparation of 40 wt % Talc composition based on polypropylene.

A PP/Talc composition was prepared by melt blending in a 30 mm Werner and Pfleiderer twin screw extruder (400°–430° F.), 60 lb of Polypropylene (melt flow rate 4) and 40 lb of Talc (Polar Minerals, Inc., Product #9102, median particle size 2–3 microns). The extrudate in the shape of a rod (2–3 mm in diameter) was quenched by passing it through a cold water trough, and chopped into pellets (2–3 mm long) and air dried.

EXAMPLE 5

Preparation of 30 wt % Talc composition based on polypropylene.

The procedure of Example 4 was repeated except that 70 lb of polypropylene and 30 lb of Talc were used.

EXAMPLE 6

Preparation of 20 wt % Talc composition based on polypropylene.

The procedure of Example 4 was repeated except that 80 lb of polypropylene and 20 lb of Talc were used.

EXAMPLE 7

Preparation of 40 wt % $TiO_2$ composition based on polypropylene.

The procedure of Example 4 is repeated except that 60 lb of polypropylene and 40 lb of $TiO_2$ were used.

EXAMPLE 8

Preparation of 20 wt % $TiO_2$, 20 wt % Talc composition based on polypropylene.

The procedure of Example 4 was repeated except that 60 lb of polypropylene, 20 lb of Talc and 20 lb of $TiO_2$ were used.

EXAMPLE 9

Preparation of 39.75 wt % Talc, 0.25 wt % Ethanox 330 antioxidant composition based on polypropylene.

The procedure of Example 4 was repeated except that 60 lb of polypropylene, 39.75 lb of Talc and 0.25 lb of Ethanox 330 was used.

EXAMPLE 10

Preparation of 39.90 wt % Talc, 0.10 wt % Irganox 1076 antioxidant composition based on polypropylene.

The procedure of Example 4 was repeated except that 60 lb of polypropylene, 39.90 lb of Talc and 0.10 lb of Irganox 1076 were used.

EXAMPLE 11

Preparation of 39.70 wt % Talc, 0.20 wt % stabilizer, 0.10 wt % Irganox 1010 antioxidant composition based on polypropylene.

The procedure of Example 4 was repeated except that 60 lb of polypropylene, 39.70 lb of Talc, 0.20 lb of dilauryl thiodipropionate and 0.10 lb of Irganox 1010 were used. The latter two compounds are present as heat stabilizers-and antioxidants.

EXAMPLE 12

Preparation of 39.70 wt % $TiO_{2,\ 0.20}$ wt % stabilizer, 0.10 wt % Irganox 1010 antioxidant composition based on a polypropylene copolymer.

The procedure of Example 4 was repeated except that 60 lb of propylene copolymer containing 5 mole % of 1-butene (melt flow rate 3.5), 39.70 lb of $TiO_2$, 0.20 lb of dilauryl thiodipropionate and 0.10 lb of Irganox 1010 was used.

EXAMPLE 13

Preparation of 10 wt % PMDA, 20 wt % Talc composition based on polypropylene.

The procedure of Example 1 was repeated except that 70 lb of polypropylene, 10 lb of PMDA, and 20 lb of Talc (Polar Minerals, Product #9102) was used.

EXAMPLE 14

Preparation of 10 wt % PMDA, 30 wt % Talc, 5 wt % $Na_2CO_3$ composition based on polypropylene.

The procedure of Example 1 was repeated except that 55 lb of polypropylene, 10 lb of PMDA, 30 lb of Talc (Polar Minerals, #9102) and 5 lb of anhydrous $Na_2CO_3$ (Rhone-Poulenc) was used.

EXAMPLE 15

Preparation of 40 wt % Talc, 10 wt % $Na_2CO_3$ composition based on polypropylene.

The procedure of Example 4 was repeated except that 50 lb of polypropylene, 40 lb of Talc (Polar Minerals, #9102) and 10 lb of anhydrous $Na_2CO_3$ (Rhone-Poulenc) was used.

EXAMPLE 16

Poly (ethylene terephthalate), PET 12440 (IV 0.70), supplied by Eastman Chemical Company, was dried at 300° F. for 6 hours (to a dew point of –40° C.) in a Conair desiccant dryer. It was fed through the main feed hopper of a 3.5" Prodex single screw extruder (L/D=24/1) equipped with a helical static mixer and an EDI 30" flex lip die having a 3 mm land length. The extruder was heated as noted below:

| Heat zone 1 | 540° F. |
|---|---|
| Heat zone 2 | 560° F. |
| Heat zone 3 | 560° F. |
| Heat zone 4 | 520° F. |
| Die Adapter | 500° F. |
| Die | 500° F. |

The composition pellets from Example 1 and 4 were dry blended manually in a 50:50 ratio (and labeled as Blend-1,4) and fed into the feed throat of the extruder using a Colormate additive feeder attached to the bottom of the PET feed hopper. This additive feeder was calibrated for the above composition blend such that any desired level of the blend could be dialed in by simply turning the control knob on the feeder. The following experimental runs were completed using different levels of the above composition blend, and the extruder screw speed; and the PET/Composition blend extrudate samples were collected at the extruder die; these samples were analyzed for free PMDA by the analytical procedure described in Test Procedure IV.

| SAMPLE | SCREW SPEED | FREE PMDA |
|---|---|---|
| PET/2.50% Conc. Blend-1,4 | 30 rpm | None Detected |
| PET/1.75% Conc. Blend-1,4 | 45 rpm | None Detected |
| PET/1.00% Conc. Blend-1,4 | 30 rpm | None Detected |
| PET/2.50% Conc. Blend-1,4 | 45 rpm | None Detected |

These results indicate that none of the four samples had any detectable levels of free PMDA.

Comparison Example 17

The procedure of Example 16 was repeated except that the composition prepared in Example 13 was used instead of the composition blend-1,4 (50:50 mix of compositions of Example 1 and 4). The extruder temperature profile was the same as in the Example 16 above. Using a pre-calibrated additive feeder as described above, the following experimental runs were completed using different levels of the composition of Example 13, and the extruder screw speed; the PET/Composition extrudate samples were collected at the extruder die, and were analyzed for Free PMDA by the analytical procedure described in Test Procedure IV.

| SAMPLE | SCREW SPEED | FREE PMDA |
|---|---|---|
| PET/2.50% Conc. Ex. 13 | 30 rpm | 29 ppm |
| PET/1.75% Conc. Ex. 13 | 45 rpm | 23 ppm |
| PET/1.75% Conc. Ex. 13 | 30 rpm | 24 ppm |
| PET/1.00% Conc. Ex. 13 | 45 rpm | 19 ppm |

These results indicate that the extrudates have significant levels of free PMDA.

Comparison Example 18

The procedure of Example 16 was repeated except that a 50:50 dry blend of the composition pellets from Examples 1 and 15 was used instead of the 50:50 dry blend of the compositions from Examples 1 and 4. The extruder temperature profile was the same as in the Example 16 above. The blend of compositions of Examples 1 and 15 was added to the PET melt using an additive feeder at a rate of 1.7 wt % (based upon the PET output rate). A sample of the PET/Composition blend extrudate was collected at the extruder die, and analyzed for Free PMDA by Test Procedure IV. This sample was shown to contain 0.0045 wt % (or 45 parts per million) of Free PMDA present in it (recall that the total amount of PMDA used to make this PET blend sample was 0.17 wt %).

EXAMPLE 19

Poly (ethylene terephthalate), PET 12440 (IV 0.70), supplied by Eastman Chemical Company, was dried at 300° C. for 6 hours (to a dew point of −40° C.) in a Conair desiccant dryer. It was then fed through the main feed hopper of a Battenfeld Gloucester tandem 2" primary/2.5" secondary foam extrusion line equipped with a 2⅞" diameter annular die and a Movacolor additive feeder attached to the feed throat of the primary extruder. Both 2" and 2.5" extruders have a 30/1 L/D ratio. Near the end of the primary extruder there is located an injection port capable of injecting a blowing agent under high pressure into the polymeric melt. The primary and the secondary extruders are connected through a well known low pressure crossover zone.

The blowing agent used in this example is an environmentally friendly hydrofluorocarbon gas, 1,1-difluoroethane (DuPont, 152A). The extruders, the crossover zone and the annular die are heated through their entire length as noted below:

| Primary 2" Extruder | Zone 1 | 520° F. |
|---|---|---|
| Primary 2" Extruder | Zone 2 | 550° F. |
| Primary 2" Extruder | Zone 3 | 550° F. |
| Primary 2" Extruder | Zone 4 | 550° F. |
| Primary 2" Extruder | Zone 5 | 553° F. |
| Crossover | Zone 6 | 545° F. |
| Crossover | Zone 7 | 539° F. |
| Seal | Zone 8 | 305° F. |
| Secondary 2.5" Extruder | Zone 9 | 497° F. |
| Secondary 2.5" Extruder | Zone 10 | 499° F. |
| Secondary 2.5" Extruder | Zone 11 | 494° F. |
| Secondary 2.5" Extruder | Zone 12 | 490° F. |
| Annular Die | Zone 13 | 489° F. |
| Annular Die | Zone 14 | 495° F. |
| Annular Die | Zone 15 | 480° F. |
| Annular Die Melt Temperature | | 488° F. |

The polypropylene/PMDA composition from Example 1 and the polypropylene/Talc composition from Example 4 were dry blended manually in a 50:50 ratio and fed into the feed throat of the primary extruder using the Movacolor additive feeder attachment at a rate of 1.5 wt (based upon the output of the PET extrudate)—this then gave a final composition of the PET extrudate as one containing 0.15 wt % PMDA, 0.30 wt % Talc and 1.05 wt % polypropylene.

Other relevant extrusion conditions and parameters are as follows:

| Pressures (psi) | |
|---|---|
| 2" extruder | 3690 |
| Crossover zone | 2640 |
| Die | 1280 |
| Blowing agent injection pressure | 2400 |
| Drive Conditions | |
| 2" extruder | 95 rpm/23 amps |
| 2.5" extruder | 23 rpm/19 amps |
| Polymer output | 83 lb/hr |
| Blowing agent injected | 0.38 lb/hr |

The foam coming from the annular die had a dry hand and good melt strength so that it can be readily stretched over a 7" diameter water cooled mandrel. The foam was slit and collected as a sheet 22" wide. The thickness and density of the foam respond well to changes in the line-speed and blowing gas level. The foam produced had a density of 0.20 g/cc at a thickness of 65 mils. It had an IV of 0.805 dl/g and a GPC weight average molecular weight of 85690 and a Mz/Mn ratio of 10.78. It also had a crystallinity of 15.9% as measured by DSC. Scanning Electron Microscopy showed the cell structure to be well formed with all cells being closed and of approximately 200 micron diameter in size.

This foam sample produced above was analyzed for the level of unreacted or free PMDA according to Test Procedure IV, and it was shown to contain no detectable free PMDA.

The above sample was also subjected to an extraction test using 8% ethanol in water at 250° F. for 2 hours inside a pressure cooker as described in Test Procedure V. The extract was then analyzed using a Liquid Chromatograph (HPLC) and the presence of any PMDA in this food stimulant was not detected. To test the accuracy of this analysis, the extract was spiked with PMDA at 32 parts per billion (ppb) (this was below the regulatory limits) and checked for % recovery. It had an average recovery of 102%.

Similarly good foaming results were achieved using compositions of Examples 2 and 5 which were mixed at a ratio of 50:50 and the mixture fed through the feeder at the rate of 2.0 wt %.

Similarly good results were also obtained when isopentane, nitrogen or carbon dioxide gas was used instead of the hydrofluorocarbon (152A) gas as the blowing agent.

Similarly good foaming results were also achieved when a combination of a chemical blowing agent and a gas blowing agent were used. Thus, the polyester was dusted with 0.5 wt % of the chemical blowing agent, azodicarbonamide, prior to the extrusion process, and then the isopentane blowing agent was used during the extrusion process as described above.

Similarly good foaming results were also achieved when 0.05 weight % of the chemical blowing agent, HYDROCEROLHK 40B, was fed into the extruder along with the polyester and the composition blend, and then a gas blowing agent, for example, 1,1-difluoroethane or nitrogen) was used during the extrusion process as described above.

EXAMPLE 20

Poly (ethylene terephthalate), PET 12440 (IV 0.70), supplied by Eastman Chemical Company, was dried at 300° F.

for 6 hours (to a dew point of −40° C.) in a portable Walton Stout desiccant dryer. It was then fed through the main feed hopper of a Battenfeld Gloucester tandem 3.5" primary/4.5" secondary foam extrusion line equipped with a 3.5" diameter annular die at the end of the secondary extruder, an additive (pellet form) feeder, and a powder additive feeder attached to the feed throat of the primary extruder. Both 3.5" and 4.5" extruders have a 30/1 L/D ratio. Near the end of the primary extruder there is located an injection port capable of injecting a blowing agent under high pressure into the polymeric melt. The primary and the secondary extruders are connected through a well known low pressure crossover zone. The blowing agent used in this example is an environmentally friendly hydrofluorocarbon gas, 1,1-difluoroethane (DuPont, 152A). The extruders, the crossover zone and the annular die are heated through their entire length as noted below:

| Primary 3.5" Extruder | Zone 1 | 445° F. |
|---|---|---|
| Primary 3.5" Extruder | Zone 2 | 544° F. |
| Primary 3.5" Extruder | Zone 3 | 538° F. |
| Primary 3.5" Extruder | Zone 4 | 529° F. |
| Primary 3.5" Extruder | Zone 5 | 518° F. |
| Primary 3.5" Extruder | Zone 6 | 510° F. |
| Screen Changer Body | | 503° F. |
| Screen Changer Slide | | 504° F. |
| Crossover | | 563° F. |
| Secondary Seal | | 174° F. |
| Secondary 4.5" Extruder | Zone 1 | 478° F. |
| Secondary 4.5" Extruder | Zone 2 | 480° F. |
| Secondary 4.5" Extruder | Zone 3 | 481° F. |
| Secondary 4.5" Extruder | Zone 4 | 477° F. |
| Annular Die | Zone 1 | 489° F. |
| Annular Die | Zone 2 | 484° F. |
| Annular Die Adapter | | 479° F. |
| Annular Die Melt Temperature | | 472° F. |

The polypropylene/PMDA composition from Example 1 was fed-in into the feed throat of the primary extruder using the pellet additive feeder attachment at a rate of 1.0 wt % (based upon the output of the PET extrudate). Powder talc (Polar Minerals Inc., Product #9102, median particle size 2–3 microns) was also fed into the feed throat of the primary extruder using the powder feeder attachment at a rate of 0.3 wt % (based upon the output of the PET extrudate). The final PET extrudate composition was therefore one containing 0.20 wt % PMDA, 0.30 wt % Talc and 0.80 wt % polypropylene.

Other relevant extrusion conditions and parameters are as follows:

| Pressures (psi) | |
|---|---|
| 3.5" Extruder | 2000–2200 |
| Crossover zone | 2000 |
| 4.5" Extruder | 1600 |
| Blowing agent injection pressure | 3630 |

| Drive Conditions | |
|---|---|
| 3.5" Extruder | 62 rpm/84 amps |
| 4.5" Extruder | 12.4 rpm/29 amps |
| Polymer output 316 lb/hour | |
| Blowing agent injected 1.0 lb/hour | |

Under these conditions, the PET/Composition/Talc composition described above extrudes with the desired characteristics needed to produce good foam. The foam coming out of the annular die has a dry hand and good melt strength so that it can be readily stretched over a 16¼" diameter water cooled mandrel (70° F.). The foam is slit, and the sheet is trimmed to 48" width and collected. The thickness and density of the foam respond well to changes in the line-speed and blowing gas level. The foam produced has a density of 0.26 g/cc at a thickness of 45 mils. It has an IV of 0.76 dl/g and a GPC weight average molecular weight of 76130 and a Mz/Mn ratio of 10.38. It also has a crystallinity of 4.56% as measured by DSC. Scanning electron microscopy show the cell structure to be well formed with all cells being closed. The average cell size was approximately 200–500 microns in diameter in the machine direction and 100–200 microns in diameter in the transverse direction. This foam PET Sheet produced above was thermoformed into foam trays using an Irwin thermoformer equipped with a heated matched mold. Typical forming conditions were as given below:

| Oven Temperatures: | | | | |
|---|---|---|---|---|
| Top | 495 | 491 | 491 | 492° F. |
| Bottom | 491 | 491 | 491 | 491° F. |
| Top/Bottom | Near Side | | | 550/500° F. |
| Top/Bottom | Far Side | | | 591/513° F. |
| Top/Bottom | Radd | | | 581/510° F. |
| Top/Bottom | Pre-heat | | | 500/522° F. |

Line speed: 10.9 cycles per minute

A sample of the foam tray produced was analyzed by DSC and it showed a % crystallinity of 28.6%; the weight average molecular weight and Mz/Mw ratio obtained by GPC were 74714 and 9.20 respectively.

A sample of the foam trays produced was analyzed for the level of unreacted or free PMDA according to Test Procedure IV, and it was shown to contain no detectable free PMDA.

These foam trays were also subjected to a complete extraction test protocol for evaluation of compliance with European Union (EU) regulations for global (total) migration (TM), antimony migration, and PMDA migration into food simulating solvents. PMDA migration into food simulating solvents was also evaluated using tests consistent with FDA guidelines (1988 Recommendations for Chemistry Data for Indirect Additive Petitions). These trays complied with all limits and no migration of PMDA was detected in any of the extracts. The data is summarized in the following table:

| | 3% Acetic Acid (100° C./2 h) | | | HB 307 Oil (175° C./2 h) | | | 8% EtOH (250° F./2 h) |
|---|---|---|---|---|---|---|---|
| | TM | Sb | PMDA | TM | Sb | PMDA | PMDA |
| | ←mg/kg→ | | | ←mg/kg→ | | | mg/kg |
| Foam Trays | .11 | .00 | .00 | 13 | .00 | .00 | .00 |
| EU LIMITS | .60 | .01 | .05 | 60 | .01 | .05 | Not Regulated |

Notes:
1) TM = terephthaloyl moieties determined by UV was used as a measure of total (global) migration.
   Sb = Antimony determined by ICP/MS.
   PMDA = pyromellitic dianhydride determined as the acid by HPLC.
2) The 3% acetic acid and HB 307 extractions were obtained by adding 100 ml solvent to the trays with a contact area of 1.8 dm$^2$.
   The 8% ethanol extractions were obtained by exposing ½ dm$^2$ strips to 50 ml solvent with wire spacers in pressure cells in the pressure cooker. A contact area of 1 dm$^2$ (double side) was -continued used in the 8% ethanol calculations.
3) Trace amounts of antimony were found in the 3% and HB 307 oil extracts but it was less than 0.01 mg/kg.
4) No PMDA was detected in the extracts. The extracts were spiked with PMDA at levels below the limits and the % recoveries of the spikes determined:
HB307 oil = Spiked at 0.033 mg/kg (EU guidelines, 6 dm$^2$/Kg of food stimulant) and 35 ppb in-food (FDA guidelines, 10 grams of food stimulant per square inch) with an average recovery of 98%.
3% Acetic acid = Spiked at 0.033 mg/kg (EU guidelines, 6 dm$^2$/Kg of food stimulant) and 36 ppb in-food (FDA guidelines, 10 grams of food stimulant per square inch) with an average recovery of 86%.
8% Ethanol = Spiked at 0.03 mg/kg (EU guidelines, 6 dm$^2$/Kg of food stimulant) and 32 ppb in-food (FDA guidelines, 10 grams of food stimulant per square inch) with an average recovery of 102%.

Similarly good foaming results are achieved using composition of Example 3 at a feed rate of 2.0 wt %, and powder $TiO_2$ at a feed rate of 0.4 wt %.

Similarly good foaming results are achieved using compositions of Examples 1 and 6 which are mixed at a ratio of 33:66 and the mixture fed through the feeder at the rate of 1.0 wt %.

Similarly good foam results are achieved using compositions of Examples 1 and 8 which are mixed at a ratio of 50:50 and fed at the rate of 1.0 wt %.

Similarly good foaming results are achieved using isopentane or nitrogen gas as the blowing agent.

Similarly good foaming results are achieved when a combination of a chemical blowing agent (e.g. 5-phenyl tetrazole or azodicarbonamide) or a sodium bicarbonate/citric acid based chemical blowing agent, and a gas blowing agent (e.g. isopentane) was used.

Similarly good foaming results are achieved using compositions of Example 1 and 7 which are each fed into the extruder using two separate feeders at the rates of 1.0wt %.

Similarly good foaming results are achieved using composition of Example 1 at a feed rate of 1.0 wt %, and either one of the compositions of Examples 9, 10, 11 or 12 also being fed into the extruder at the same rate of 1.0wt %.

Comparison Example 21

The procedure of Example 20 was repeated except that the composition of Example 14 was used instead of the composition of Example 1 and powder talc. The extruder drive, pressure and temperature profiles were the same as in Example 20. The composition of Example 14 was used at a rate of 2.0 wt %; thus the final PET extrudate composition was one containing 6.20 wt % PMDA, 0.60 wt % Talc, 0.10 wt % anhydrous $Na_2CO_3$ and 1.10 wt % polypropylene. This composition extruded with the desired characteristics needed to produce good foam. The foam coming out of the annular die has a dry hand and good melt strength so that it can be readily stretched over a 16¼" diameter water cooled mandrel (70° F.). The foam sheet is collected in the form of a 489 wide roll as described in Example 20. The foam produced has a density of 0.30 g/cc at a gauge thickness of 100 mils. It has an IV of 0.78 dl/g and a GPC weight average molecular weight of 73739 and a Mz/Mn ratio of 14.96. Scanning Electron Microscopy show the cell structure to be well formed with all cells being closed and of approximately 210 micron diameter in size. A sample of this foam sheet produced was analyzed for the level of unreacted or free PMDA according to the analytical procedure described in Test Procedure IV, and it was shown to contain 0.048 wt % (or 480 parts per million) of free PMDA (recall that the total amount of PMDA used to make this foam sample was 0.20 wt %).

Comparison Example 22

The procedure of Example 20 was repeated except that the additives PMDA, Talc and $Na_2CO_3$ were all added in the powder form using powder additive feeder attachments. The levels that the powder additives were added-in were such that the final composition of the PET extrudate was one containing 0.15 wt % PMDA, 0.45 wt % Talc and 0.10 wt % $Na_2CO_3$. Under these conditions, although we were able to produce PET foam of good physical appearance and cell size, when we analyzed a sample of this foam for the level of unreacted or free PMDA according to the analytical procedure described in Test Procedure IV, we found that it contained as much as 0.0155 wt % (or 155 parts per million) of free PMDA. The foamed compositions of Example 16, 19 and 20 were prepared according to the teachings of the present invention and display less than 5 ppm of unreacted or free monomeric branching agent. Moreover these foam compositions have improved melt viscosity and melt strength. For example, a 0.9 IV PET has a melt viscosity of about 19,000 poise at 280° C., and a melt strength of −51% at 280° C. When branched with 0.2% pyromellitic dianhydride from the composition, the melt viscosity is about 117,000 poise at 280° C., and the melt strength is about +40% at 280° C.

It is clear from the examples that the use of any reactive organic or inorganic compounds of Group I, II or III metals in the process of the present invention has an adverse effect on the amount of unreacted or free monomeric branching agent in the final polyester product.

Example 13 describes the preparation of a composition in which the additive, talc, has been added together with PMDA into the polypropylene carrier. In Example 17, the composition of Example 13 was used to prepare a PET/composition blend which contained significant levels of free or unreacted PMDA (19–29 ppm depending upon the level of composition used). In contrast, a blend was prepared in Example 16, which did not Contain any unreacted PMDA branching agent using a 50:50 mixture of the PP/PMDA and PP/Talc compositions prepared in Examples 1 and 4, respectively. In Example 15, a composition was prepared in which both talc and $Na_2CO_3$ were compounded together into the polypropylene carrier. Example 18 incorporated the composition prepared in Example 15 to into a PET/1.7 weight percent composition blend which contained 45 ppm of free or unreacted PMDA. In contrast, the PET/1.75 weight percent composition blend prepared in Example 17, which did not contain any $Na_2CO_3$, was determined to contain only 23 ppm of free or unreacted PMDA present.

A similar situation is found when comparing Examples 19 and 20 which have no detectable unreacted or free PMDA to Examples 21 and 22 which have 480 ppm and 155 ppm, respectively, of free and unreacted PMDA.

The foam trays produced in Example 20 were also subjected to a complete extraction test protocol for evaluation of compliance with European Union (EU) regulations for global (total) migration, antimony migration, and PMDA migration into food simulating solvents. The test protocol also provided for evaluation of PMDA migration into food simulating solvents consistent with Food and Drug Administration (FDA) guidelines (1988 Recommendations for Chemistry Data for Indirect Additive Petitions). No migration of PMDA was detected in any of the extracts. The calibration limit for the test of extractable PMDA in food simulating solvents was 15 parts per billion (ppb).

The invention has been described in detail with particular reference to preferred embodiments thereof, but it will be understood that variations and modifications can be effected within the spirit and scope of the invention.

What is claimed is:

1. A process for preparing a foamable branched polyester composition having a reduced level of unreacted monomeric branching agent, comprising melt blending:
   (A) a composition consisting essentially of:
      (1) 50 to 99 weight % of a polyolefin having a repeat unit selected from the group consisting of ethylene, propylene, butene, and combinations thereof, provided the ethylene polymers have a melt index of 0 to 100 at 190° C. as measured by ASTM D1238-56T, and the propylene and butene polymers have a melt flow rate of 0 to 100 at 230° C. as measured by ASTM D1238-56T; and
      (2) 1 to 50 weight % of a monomeric branching agent having a molecular weight of 50 to 5000 selected from the group consisting of a carboxylic acid having at least two carboxyl groups, and an anhydride having at least one anhydride group, and combinations thereof, provided a reactive compound of a Group I, II, or III metal is not included in composition (A);
   (B) at least one nucleating agent in powder form; and
   (C) a polyester having an inherent viscosity of 0.4 to 1.1 dL/g comprising repeat units from
      (a) a dicarboxylic acid selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms, and combinations thereof; and
      (b) a diol selected from the group consisting of cycloaliphatic diols having 6 to 20 carbon atoms, aliphatic diols having 3 to 20 carbon atoms, and combinations thereof,
   wherein the foamable branched polyester composition comprises 0.1 to 20 weight % of (A), 0.01 to 10 weight % of (B), 80 to 99.9 weight % of (C), based on the total weight of (A), (B), and (C).

2. A process for preparing a foamable branched polyester composition having a reduced level of unreacted monomeric branching agent, comprising melt blending:
   (A) a composition consisting essentially of:
      (1) 50 to 99 weight % of a polyolefin having a repeat unit selected from the group consisting of ethylene, propylene, butene, and combinations thereof, provided the ethylene polymers have a melt index of 0 to 100 at 190° C. as measured by ASTM D1238-56T, and the propylene and butene polymers have a melt flow rate of 0 to 100 at 230° C. as measured by ASTM D1238-56T; and
      (2) 1 to 50 weight % of a monomeric branching agent having a molecular weight of 50 to 5000 selected from the group consisting of a carboxylic acid having at least two carboxyl groups, and an anhydride having at least one anhydride group, and combinations thereof, provided a reactive compound of a Group I, II, or III metal is not included in composition (A);
   (B) a composition consisting essentially of:
      (3) 50 to 99 weight % of a polyolefin having a repeat unit selected from the group consisting of ethylene, propylene, butene, and combinations thereof, provided the ethylene polymers have a melt index of 0 to 100 at 190° C, and the propylene and butene polymers have a melt flow rate of 0 to 100 at 230° C; and
      (4) 1 to 50 weight % of at least one nucleating agent, provided a reactive compound of a Group I, II, or III metal is not included in composition (B'); and
   (C) a polyester having an inherent viscosity of 0.4 to 1.1 dL/g comprising repeat units from
      (a) a dicarboxylic acid selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms, and combinations thereof; and
      (b) a diol selected from the group consisting of cycloaliphatic diols having 6 to 20 carbon atoms, aliphatic diols having 3 to 20 carbon atoms, and combinations thereof,
   wherein the foamable branched polyester composition comprises 0.1 to 20 weight % of (A), 0.02 to 20 weight % of (B'), 80 to 99.9 weight % of (C), based on the total weight of (A), (B'), and (C).

3. A process for preparing a foamable branched polyester composition having a reduced level of unreacted monomeric branching agent, comprising melt blending:
   (A) a composition consisting essentially of:
      (1) 70 to 95 weight % of a polyolefin having a repeat unit selected from the group consisting of ethylene, propylene, butene, and combinations thereof, provided the ethylene polymers have a melt index of 0 to 100 at 190° C. as measured by ASTM D1238-56T, and the propylene and butene polymers have a melt flow rate of 0 to 100 at 230° C. as measured by ASTM D1238-56T; and
      (2) 5 to 30 weight % of a monomeric branching agent having a molecular weight of 50 to 5000 selected from the group consisting of a carboxylic acid having at least two carboxyl groups, and an anhydride having at least one anhydride group, and combinations thereof, provided a reactive compound of a Group I, II, or III metal is not included in composition (A);
   (B') a composition consisting essentially of:
      (3) 60 to 80 weight % of a polyolefin having a repeat unit selected from the group consisting of ethylene, propylene, butene, and combinations thereof, provided the ethylene polymers have a melt index of 0 to 100 at 190° C., and the propylene and butene polymers have a melt flow rate of 0 to 100 at 230° C.; and
      (4) 20 to 40 weight % of at least one nucleating agent, provided a reactive compound of a Group I, II, or III metal is not included in composition (B'); and
   (C) a polyester having an inherent viscosity of 0.4 to 1.1 dL/g comprising repeat units from
      (a) a dicarboxylic acid selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms, and combinations thereof; and
      (b) a diol selected from the group consisting of cycloaliphatic diols having 6 to 20 carbon atoms, aliphatic diols having 3 to 20 carbon atoms, and combinations thereof,
   wherein the foamable branched polyester composition comprises 1 to 10 weight % of (A), 1 to 10 weight % of (B'), 80 to 98 weight % of (C), based on the total weight of (A), (B'), and (C).

4. The process of claim 1 wherein the nucleating agent is added in an amount of 0.1 to 2 weight %, based on the total weight of (A), (B), and (C).

5. The process of claim 1 wherein the polyolefin, component (1), is selected from the group consisting of polyethylene and polypropylene.

6. The process of claim 2 wherein the polyolefin, component (3), is selected from the group consisting of polyethylene and polypropylene.

7. The process of claim 1 wherein the monomeric branching agent, component (2), is selected from the group consisting of trimesic acid, pyromellitic acid, pyromellitic dianhydride, trimellitic anhydride, benzenetetra carboxylic anhydride, benzophenone tetracarboxylic anhydride, hemimellitic acid, trimellitic acid, trimesic acid, pyromellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, and combinations thereof.

8. The process of claim 7 wherein the monomeric branching agent is selected from the group consisting of pyromellitic dianhydride, trimellitic anhydride, benzenetetracarboxylic dianhydride, and benzophenone tetracarboxylic dianhydride.

9. The process of claim 1 wherein the nucleating agent is selected from the group consisting of titanium dioxide, talc, chopped fiber glass, alumina, clay, and fumed silica.

10. The process of claim 9 wherein the nucleating agent is talc.

11. The process of claim 1 wherein the dicarboxylic acid component of the polyester is selected from the group consisting of terephthalic acid, phthalic acid, isophthalic acid, naphthalene-2,6-dicarboxylic acid, cyclohexanedicarboxylic acid, cyclohexanediacetic acid, and combinations thereof.

12. The process of claim 11 wherein the dicarboxylic acid is terephthalic acid.

13. The process of claim 1 wherein the diol component of the polyester is selected from the group consisting of 1,4-cyclohexanedimethanol, ethylene glycol, diethylene glycol, triethylene glycol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol--(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

14. The process of claim 13 wherein the diol component of the polyester is ethylene glycol.

15. The process of claim 1 wherein the polyester additionally contains 0.1 to 10 weight percent of at least one additive selected from the group consisting of titanium dioxide, talc, chopped fiber glass, alumina, clay, fumed silica, stabilizers, antioxidants, buffers, flame retardants, lubricants, extenders, colorants, pigments, carbon black, dyes, and nucleating agents.

16. The process of claim 1 wherein the polyester contains an antioxidant in an amount up to two percent by weight of the polyester.

17. The process of claim 16 wherein the antioxidant is present in an amount of 0.1 to 1 percent by weight of the polyester.

18. The process of claim 1 wherein the foamable branched polyester composition has less than 50 parts per million (ppm) of unreacted monomeric branching agent.

19. The process of claim 18 wherein the foamable branched polyester composition has less than 5 parts per million (ppm) of unreacted monomeric branching agent.

20. The process of claim 2 wherein the foamable branched polyester composition has less than 50 parts per million (ppm) of unreacted monomeric branching agent.

21. The process of claim 20 wherein the foamable branched polyester composition has less than 5 parts per million (ppm) of unreacted monomeric branching agent.

22. The process of claim 1 wherein the foamable branched polyester composition is extruded into a sheet and formed into an article.

23. The process of claim 1 wherein the foamable branched polyester composition is melted inside an extruder, injected with a gas blowing agent, extruded into a foamed sheet and formed into an article.

24. The process of claim 1 wherein a chemical blowing agent is added to the foamable branched polyester composition and the composition is melted inside an extruder, injected with a gas blowing agent, extruded into a foamed sheet and formed into an article.

25. The process of claim 1 wherein a chemical blowing agent is added to the foamable branched polyester composition and the composition is melted inside an extruder, extruded into a sheet and formed into an article.

* * * * *